(12) United States Patent
Shiina

(10) Patent No.: US 10,383,078 B2
(45) Date of Patent: Aug. 13, 2019

(54) TIMING SIGNAL OUTPUT DEVICE AND ELECTRONIC DEVICE

(71) Applicant: Seiko Epson Corporation, Tokyo (JP)

(72) Inventor: Jun Shiina, Minowa (JP)

(73) Assignee: Seiko Epson Corporation (JP)

(*) Notice: Subject to any disclaimer, the term of this patent is extended or adjusted under 35 U.S.C. 154(b) by 0 days.

(21) Appl. No.: 15/914,441

(22) Filed: Mar. 7, 2018

(65) Prior Publication Data

US 2018/0270774 A1   Sep. 20, 2018

(30) Foreign Application Priority Data

Mar. 17, 2017 (JP) ................................ 2017-053810

(51) Int. Cl.
| | |
|---|---|
| H04W 24/00 | (2009.01) |
| H04W 56/00 | (2009.01) |
| G01S 19/13 | (2010.01) |
| H04W 4/02 | (2018.01) |
| H04L 7/04 | (2006.01) |
| H04W 4/44 | (2018.01) |

(52) U.S. Cl.
CPC .......... *H04W 56/006* (2013.01); *G01S 19/13* (2013.01); *H04L 7/042* (2013.01); *H04W 4/026* (2013.01); *H04W 4/44* (2018.02); *H04W 56/0015* (2013.01)

(58) Field of Classification Search
None
See application file for complete search history.

(56) References Cited

U.S. PATENT DOCUMENTS

| | | | |
|---|---|---|---|
| 2009/0034371 A1* | 2/2009 | Matzusaki | G01S 11/10 368/14 |
| 2012/0188125 A1* | 7/2012 | Pomietlasz | G01S 13/87 342/357.68 |
| 2014/0266884 A1* | 9/2014 | Raghupathy | H04W 56/00 342/357.63 |
| 2015/0185329 A1* | 7/2015 | Shimada | G01S 19/39 342/357.51 |

FOREIGN PATENT DOCUMENTS

| | | |
|---|---|---|
| JP | 2006-157302 A | 6/2006 |
| JP | 2014-137318 A | 7/2014 |
| JP | 2015-068729 A | 4/2015 |

* cited by examiner

*Primary Examiner* — Suhail Khan
(74) *Attorney, Agent, or Firm* — Harness, Dickey & Pierce, P.L.C.

(57) ABSTRACT

A timing signal output device includes a timing signal generation circuit which generates a timing signal synchronized with a reference signal based on a satellite signal received from at least one positioning satellite, the timing signal being synchronized with the reference signal at a timing based on an elevation angle of a positioning satellite.

10 Claims, 7 Drawing Sheets

TIMING SIGNAL OUTPUT DEVICE AND ELECTRONIC DEVICE

This application claims priority to Japanese Patent Application No. 2017-053810, filed Mar. 17, 2017, the entirety of which is hereby incorporated by reference.

BACKGROUND

1. Technical Field

The present invention relates to a timing signal output device and an electronic device.

2. Related Art

A timing signal output device which generates a highly accurate timing signal by using time information included in a satellite signal from a satellite is known (for example, refer to JP-A-2014-137318). For example, the timing signal output device described in JP-A-2014-137318 includes: a GPS receiver which receives a satellite signal transmitted from a global positioning system (GPS) satellite and generates a timing signal (1 PPS); and an oscillator which oscillates in synchronization with the timing signal from the GPS receiver.

However, in the timing signal output device described in JP-A-2014-137318, since the oscillation of the oscillator is synchronized with the timing signal from the GPS receiver as it is, in a case where there is an error in the timing signal generated by the GPS receiver, the accuracy (that is, the frequency accuracy of the timing signal to be generated) of the oscillation frequency of the oscillator also deteriorates in some cases.

SUMMARY

An advantage of some aspects is to provide a timing signal output device which is capable of reducing accuracy deterioration of a timing signal, and to provide an electronic device and a vehicle including the timing signal output device.

The invention can be implemented as the following application examples or embodiments.

A timing signal output device according to an application example includes: a timing signal generation circuit which generates a timing signal synchronized with a reference signal based on a satellite signal received from at least one positioning satellite, the timing signal being synchronized with the reference signal at a timing based on an elevation angle of a positioning satellite.

According to the timing signal output device, a timing signal synchronized with the reference signal at the timing based on the elevation angle of the satellite is generated. The error of arrival time of the satellite signal to a receiver differs depending on the magnitude of the elevation angle of the positioning satellite. There is a case where the error of the arrival time affects the accuracy of the timing signal. Therefore, by generating the timing signal synchronized with the reference signal at the timing based on the elevation angle of the positioning satellite, it is possible to reduce the error of the timing signal caused by the error of the arrival time of the satellite signal that corresponds to the elevation angle of the satellite. Therefore, it is possible to reduce accuracy deterioration of the timing signal.

In the timing signal output device according to the application example, it is preferable that the timing signal generation circuit corrects the timing of synchronization of the timing signal with respect to the reference signal based on the elevation angle.

With this configuration, it is possible to reduce the error of the timing signal caused by the error of the arrival time of the satellite signal that corresponds to the elevation angle of the satellite.

In the timing signal output device according to the application example, it is preferable that the timing signal generation circuit includes a first mode for repeatedly obtaining a position based on the satellite signal, and a second mode for determining a position of a reception point using the repeatedly obtained position and generating the timing signal.

With this configuration, in the first mode, it is possible to repeatedly obtain the position of the reception point. In addition, in the second mode, since the position is determined by using the repeatedly obtained position, it is possible to generate a more accurate timing signal than that in a case of obtaining the position one time.

In the timing signal output device according to the application example, it is preferable that the timing signal generation circuit corrects the timing of synchronization in a case of the first mode.

In a case of obtaining the position, for example, there is a case where the accuracy of the reference signal deteriorates as a result of using the satellite signals from the positioning satellites positioned in a wide range of elevation angle in order to improve the positioning accuracy. Meanwhile, in the application example with the configuration described above, since the correction is performed in a case of the first mode, it is possible to reduce accuracy deterioration of the timing signal.

In the timing signal output device according to the application example, it is preferable that the timing signal generation circuit corrects the timing of synchronization in a case of the second mode.

With this configuration, in addition to making the accuracy of the timing signal excellent in the second mode, the accuracy deterioration of the timing signal can further be reduced by the correction, and thus, it is possible to generate a more accurate timing signal.

In the timing signal output device according to the application example, it is preferable that a receiver configured to receive the satellite signal and output the reference signal and the position based on the satellite signal, is further provided, and the timing signal generation circuit sets an elevation angle mask of the receiver to a first angle in a case of the first mode, and sets the elevation angle mask to a second angle which is greater than the first angle in a case of the second mode.

With this configuration, in the first mode, by widening the range of the elevation angle mask, it is possible to increase the number of positioning satellites which receive the satellite signal by the receiver, and to improve the accuracy of an output position. Meanwhile, in the second mode, the elevation angle mask having the second angle which is greater than the first angle is set. A satellite signal from the positioning satellite with a small elevation angle is likely to have an error in arrival time than a satellite signal from a positioning satellite having a large elevation angle. Therefore, by using the satellite signal from the positioning satellite with a large elevation angle, it is possible to improve the accuracy of the timing signal.

In the timing signal output device according to the application example, it is preferable that the first angle is 0° or greater and 30° or less, and the second angle is 30° or greater and 50° or less.

With this configuration, it is possible not only to obtain a position at which the accuracy is excellent in the first mode, but also to suppress the accuracy deterioration of the timing signal in the second mode.

In the timing signal output device according to the application example, it is preferable that the timing signal generation circuit corrects the timing of synchronization in a case where the elevation angle of at least one positioning satellite is equal to or less than a predetermined angle.

With this configuration, in a case where there is at least one satellite of which the elevation angle is equal to or less than the predetermined angle, the correction is performed, and thus, it is possible to suppress accuracy deterioration of the timing signal.

In the timing signal output device according to the application example, it is preferable that a storage in which a coefficient or a table used for the correction are stored is further provided.

With this configuration, it is possible to correct the timing of synchronizing the timing signal with the reference signal using the coefficient or table stored in the storage.

In the timing signal output device according to the application example, it is preferable that the timing signal generation circuit includes an oscillator which outputs a clock signal, a synchronizer which generates the timing signal by synchronizing the clock signal and the reference signal at the timing, and a timing corrector which corrects the timing of synchronization by controlling the synchronizer based on the elevation angle of the satellite.

With this configuration, it is possible to correct the timing of synchronizing the timing signal with the reference signal by a relatively simple configuration.

An electronic device according to an application example includes the timing signal output device according to the application example.

According to the electronic device, it is possible to improve the characteristics of the electronic device by using a highly accurate timing signal from the timing signal output device.

A vehicle according to an application example includes the timing signal output device according to the application example.

According to the vehicle, it is possible to improve the characteristics of the vehicle by using a highly accurate timing signal from the timing signal output device.

BRIEF DESCRIPTION OF THE DRAWINGS

The invention will be described with reference to the accompanying drawings, wherein like numbers reference like elements.

DESCRIPTION OF EXEMPLARY
EMBODIMENTS

Hereinafter, a timing signal output device, an electronic device, and a vehicle will be described in detail based on embodiments illustrated in the attached drawings.

1. Timing Signal Output Device
First Embodiment

Figure 1:
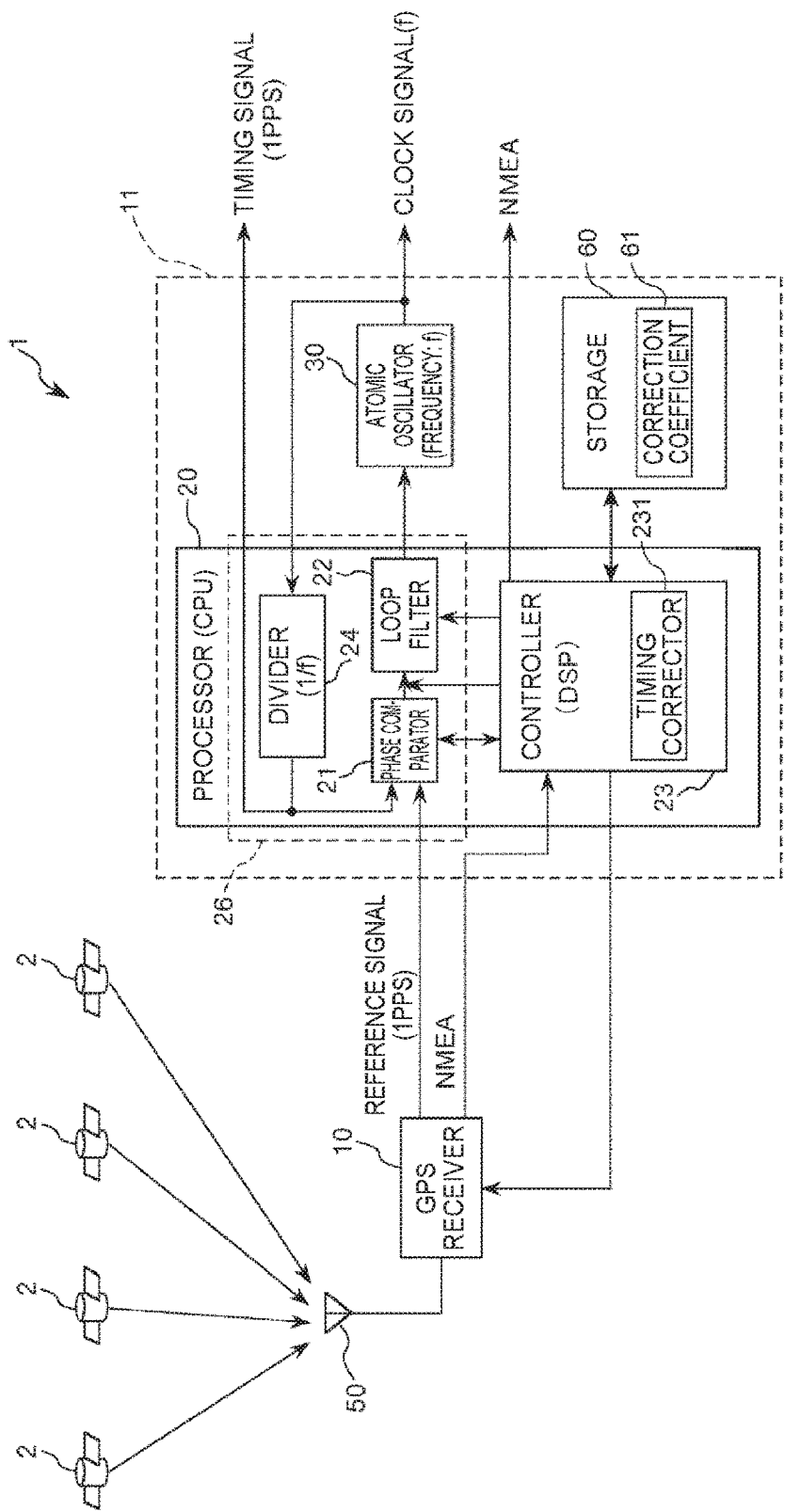
FIG. 1 is a view illustrating a schematic configuration example of a timing signal output device according to a first embodiment.

FIG. 1 is a view illustrating a schematic configuration example of a timing signal output device according to a first embodiment.

A timing signal output device 1 illustrated in FIG. 1 has a function of receiving a satellite signal transmitted from a GPS satellite 2 (an example of a satellite) and generating 1 PPS having high accuracy as a timing signal. The timing signal output device 1 includes a GPS receiver 10 (receiver) and a timing signal generation circuit 11. Here, the timing signal generation circuit 11 includes a processor 20 (CPU), an atomic oscillator 30 (oscillator), and a storage 60. The timing signal output device 1 can also be referred to as an example of an electronic device.

In addition, in the timing signal output device 1, a part or the entirety of the configuration elements may be physically separated from each other or integrated to each other. For example, the GPS receiver 10 and the processor 20 may be respectively realized as separate ICs, or the GPS receiver 10 and the processor 20 may be realized as one-chip ICs.

Hereinafter, each part of the timing signal output device 1 will be sequentially described.

GPS Receiver

The GPS receiver 10 has a function of performing various types of processing based on satellite signals received via a GPS antenna 50.

More specifically, the GPS receiver 10 has a normal positioning mode (first mode) and a position fixing mode (second mode), and in response to a control command from the processor 20, the GPS receiver 10 sets the normal positioning mode and the position fixing mode.

In the normal positioning mode (first mode), the GPS receiver 10 receives satellite signals transmitted from a plurality (preferably, four or more) of GPS satellites 2, and performs positioning calculation (computing the position of a reception point) based on orbit information (specifically, ephemeris data, almanac data, and the like) included in the received satellite signal, and time information (specifically, week number data, Z count data, and the like). The result of the positioning calculation is used for calculation (statistical processing) of the position of the final reception point in the processor 20. Here, the normal positioning mode is a mode in which the positioning calculation is performed continuously.

In addition, in the position fixing mode (second mode), the GPS receiver 10 receives satellite signals transmitted from at least one GPS satellite 2, and generates 1 pulse per second (PPS) as a "reference signal" based on the orbit information and the time information which are included in the received satellite signals and the position information of the set reception point. The 1 PPS is a pulse signal completely synchronized with UTC (Coordinated Universal Time), and includes 1 pulse every second. In this manner, as the satellite signal used for generating the reference signal by the GPS receiver 10 includes the orbit information and the time information, it is possible to generate a reference signal accurately synchronized with the reference time. The reference signal is used in the processor 20 to generate a final timing signal. Here, the position fixing mode is a mode in which 1 PPS is output using preset position information (for example, the position information of the reception point computed in the first mode).

Here, the GPS receiver 10 uses satellite signals from at least one GPS satellite 2 when generating 1 PPS which is a reference signal. In a case where there are a plurality of received satellite signals, the GPS receiver 10 performs statistical processing (for example, averaging processing) of reference signals based on a plurality of satellite signals to generate one reference signal (average value). In addition, in a case where there is only one satellite signal received, the GPS receiver 10 does not perform the statistical processing.

Although not illustrated, the GPS receiver 10 includes, for example, a surface acoustic wave (SAW) filter, an RF processor, a baseband processor, and a temperature compensated crystal oscillator (TCXO). Here, the SAW filter performs processing for extracting the satellite signal from the radio wave received by the GPS antenna 50. In addition, the RF processor generates a clock signal obtained by multiplying an oscillation signal of the TCXO, mixes the clock signal and the satellite signal with each other, AD-converts the mixed signal after removing a high frequency signal, and outputs the mixed signal. The baseband processor includes a digital signal processor (DSP), a central processing unit (CPU), a static random access memory (SRAM), and a real time clock (RTC), and performs various types of processing using the oscillation signal of TCXO as a clock signal.

Processor

The processor 20 illustrated in FIG. 1 transmits various control commands to the GPS receiver 10 to control the operation of each of the GPS receivers 10, receives 1 PPS or NMEA data output by the GPS receiver 10, and performs various types of processing. Here, the processor 20 may perform various types of processing in accordance with a memory (not illustrated) or a program stored in the storage 60.

As illustrated in FIG. 1, the processor 20 includes a phase comparator 21, a loop filter 22, a controller 23 (DSP: digital signal processor), and a frequency divider 24.

The controller 23 periodically (for example, every one second) obtains the NMEA data from the GPS receiver 10, collects the position information (the result of the positioning calculation in the normal positioning mode by the GPS receiver 10) included in the NMEA data, creates the statistical information at a predetermined time, and performs processing for generating the position information of the reception point based on the statistical information. Here, the controller 23 generates the position information of the reception point, for example, based on an average value, a mode, or a median of the plurality of positioning calculation results in the normal positioning mode by the GPS receiver 10.

In addition, the controller 23 has a function of controlling the operation of the synchronizer 26 which will be described later based on the satellite information included in the NMEA data. In the embodiment, the satellite information is elevation angle information. In addition to the elevation angle, the satellite information may include information, such as time, PRN number (satellite number), and the like. When controlling the operation of the synchronizer 26, the controller 23 uses information (correction coefficient 61 in the embodiment) stored in the storage 60 which will be described later. In other words, the controller 23 has a timing corrector 231 that corrects the synchronization timing by the synchronizer 26 using the correction coefficient 61. In the embodiment, the controller 23 adds a signal (voltage) that corresponds to the correction value based on the elevation angle of the GPS satellite 2 to the output signal (voltage) of the phase comparator 21, inputs the signal (voltage) to the loop filter 22, and accordingly, adjusts a control voltage of the atomic oscillator 30. Accordingly, by shifting a phase of 1 PPS (reference signal) output by the GPS receiver 10 and a 1 Hz frequency-divided clock signal (a signal based on the clock signal of the atomic oscillator 30) output by the frequency divider 24 in accordance with the correction value from the controller 23, it is possible to correct the synchronization timing. In addition, this point will be described in detail later.

In addition, the controller 23 transmits various control commands to the GPS receiver 10, and controls the operation of the GPS receiver 10. Specifically, the controller 23 performs processing for transmitting a control command for setting the mode to the GPS receiver 10, and switching the GPS receiver 10 from the normal positioning mode to the position fixing mode. In addition, before switching the GPS receiver 10 from the normal positioning mode to the position fixing mode, the controller 23 performs processing for transmitting a control command for position setting to the GPS receiver 10, and setting the position information of the reception point generated by the controller 23 to the GPS receiver 10.

The frequency divider 24 divides the frequency of the clock signal (frequency: f) output by the atomic oscillator 30 by f, and outputs the 1 Hz frequency-divided clock signal.

The phase comparator 21 compares the phase of 1 PPS (reference signal) output by the GPS receiver 10 with the 1 Hz frequency-divided clock signal (a signal based on the clock signal of the atomic oscillator 30) output by the frequency divider 24, and outputs a phase difference signal having a voltage value that corresponds to the phase difference as a comparison result. The phase difference signal is input to the atomic oscillator 30 via the loop filter 22. The parameters of the loop filter 22 are set by the controller 23 independently from the signal (voltage) that corresponds to the correction value based on the elevation angle of the above-described GPS satellite 2.

The 1 Hz frequency-divided clock signal output by the frequency divider 24 is synchronized with 1 PPS output by the GPS receiver 10, and the timing signal output device 1 synchronizes the frequency-divided clock signal with UTC and outputs the signal as 1 PPS having an extremely high frequency accuracy to the outside. In addition, the timing signal output device 1 outputs the latest NMEA data to the outside in synchronization with 1 PPS every second.

Here, the atomic oscillator 30 is configured so that the frequency can be adjusted in accordance with the output voltage (control voltage) of the loop filter 22, and as described above, by the phase comparator 21, the loop filter 22, and the frequency divider 24, the clock signal output from the atomic oscillator 30 completely synchronized with 1 PPS output by the GPS receiver 10. In other words, the phase comparator 21, the loop filter 22, and the frequency divider 24 configure the synchronizer 26, and synchronize the clock signal output by the atomic oscillator 30 with 1 PPS from the GPS receiver 10. Accordingly, it is possible to output the clock signal from the atomic oscillator 30 as a highly accurate timing signal synchronized with 1 PPS from the GPS receiver 10.

In addition, when the GPS receiver 10 cannot receive the satellite signal or the reception environment is not friendly, the accuracy of 1 PPS output by the GPS receiver 10 deteriorates, or the GPS receiver 10 stops the output of 1 PPS. In this case, the processor 20 stops the processing for synchronizing the clock signal output by the atomic oscillator 30 with the 1 PPS output by the GPS receiver 10 (synchronizing processing by the synchronizer 26) to free-run oscillate (holdover) the atomic oscillator 30. According to this, the timing signal output device 1 can output 1 PPS with high frequency accuracy due to free-running oscillation of the atomic oscillator 30 even in a case where the accuracy of 1 PPS output by the GPS receiver 10 deteriorates. In this manner, even when the GPS receiver 10 cannot output the reference signal in the timing signal output device 1, by using the clock signal from the atomic oscillator 30, it is possible to generate a highly accurate timing signal.

Atomic Oscillator (Oscillator)

The atomic oscillator 30 illustrated in FIG. 1 is an oscillator which can output a clock signal having high frequency accuracy using energy transition of atoms, such as rubidium atoms and cesium atoms. As the atomic oscillator 30, for example, an atomic oscillator of a system using an electromagnetically induced transparency (EIT) phenomenon (also called a coherent population trapping (CPT) phenomenon), an atomic oscillator of a system using an optical micro double resonance phenomenon, or the like can be used.

In addition, even when using a crystal oscillator, such as a double oven or single oven thermostat type crystal oscillator (OCXO), a voltage controlled crystal oscillator (VCXO), a crystal oscillator circuit with temperature compensation circuit (TCXO), or the like instead of the atomic oscillator 30, it is possible to output 1 PPS with high frequency accuracy due to free-running oscillation.

Storage

The storage 60 illustrated in FIG. 1 has a function of storing various pieces of information necessary for the operation of the controller 23. In particular, the correction coefficient 61 is stored in the storage 60. The correction coefficient 61 is a coefficient used for correcting the synchronization timing of the synchronizer 26 based on the elevation angle of the GPS satellite 2, and can be expressed by, for example, delay time [ns]/elevation angle [°]. In the drawing, the storage 60 is provided separately from the processor 20, but maybe incorporated in the processor 20 (for example, the controller 23). In addition, the storage 60 is not particularly limited, and for example, a nonvolatile memory or a volatile memory can be used. In addition, the correction coefficient 61 will be described in detail together with a description of correction of the synchronization timing which will be described later.

Above, the configuration of the timing signal output device 1 has been briefly described above. When generating the timing signal in the timing signal output device 1, based on the elevation angle of the GPS satellite 2, a timing (hereinafter referred to as "synchronization timing") obtained by synchronizing the output timing signal and an output signal of the GPS receiver 10 is corrected. Accordingly, it is possible to reduce accuracy deterioration of the timing signal.

Correction of Synchronization Timing

Hereinafter, the correction of the clock signal of the atomic oscillator 30 will be described in detail.

Figure 2:
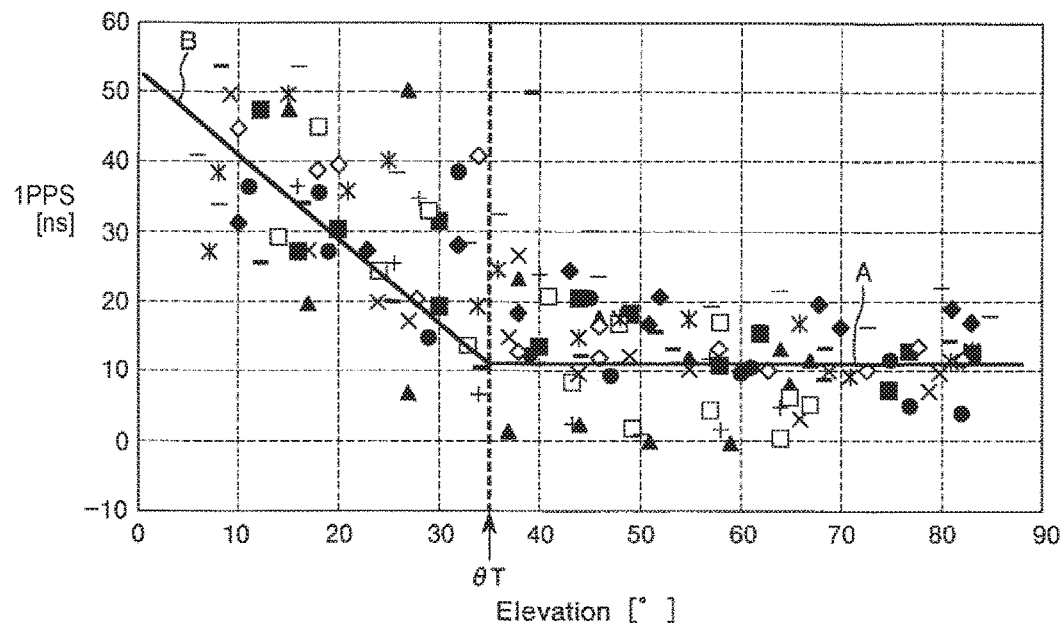
FIG. 2 is a graph illustrating a relationship between an elevation angle of a GPS satellite and accuracy (error) of a reference signal (1 PPS) output from a GPS receiver.
Figure 3:
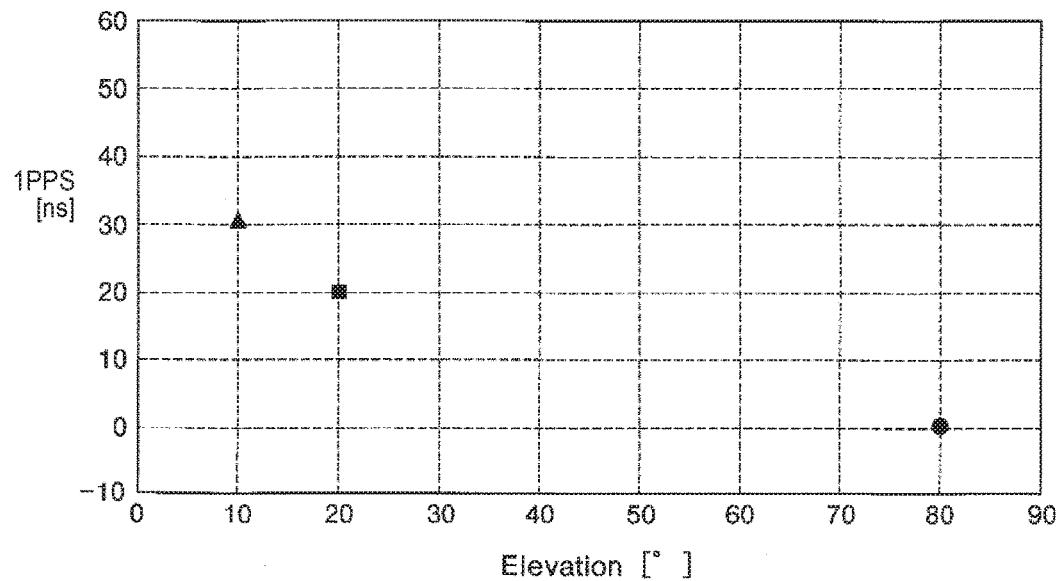
FIG. 3 is a graph illustrating an example of a relationship between elevation angles of a plurality of GPS satellites used when a GPS receiver generates a reference signal and accuracy (error) of a reference signal (1 PPS).

FIG. 2 is a graph illustrating a relationship between the elevation angle of the GPS satellite and the accuracy (error) of the reference signal (1 PPS) output from the GPS receiver, regarding each of the GPS satellites. FIG. 3 is a graph illustrating an example of a relationship between elevation angles of the plurality of GPS satellites used when the GPS receiver generates the reference signal and accuracy (error) of the reference signal (1 PPS).

In addition, in both FIG. 2 and FIG. 3, the horizontal axis represents the elevation angle (°) and the vertical axis represents the accuracy of the reference signal (nanoseconds). In addition, the vertical axis (1 PPS) illustrated in FIGS. 2 and 3 is an error of the reference signal (1 PPS) with respect to a certain reference, and illustrates a case where the accuracy deteriorates as the absolute value of the numerical value increases.

As illustrated in FIG. 2, the accuracy (frequency accuracy) of the reference signal (1 PPS) output from the above-described GPS receiver 10 decreases when the elevation angle of the GPS satellite 2 is relatively small. This is because, when the elevation angle of the GPS satellite 2 is relatively small, the error of arrival time of the satellite signal to the GPS receiver 10 becomes greater (the delay time becomes longer). Factors of such errors include, for example, tropospheric delay, ionospheric delay and the like.

More specifically, when the elevation angle of the GPS satellite 2 is 35° (threshold θT) or less, as indicated by the line segment B in FIG. 2, the accuracy of the reference signal (1 PPS) output from the GPS receiver 10 becomes smaller (the error becomes greater and the accuracy deteriorates) as the elevation angle of the GPS satellite 2 becomes smaller. Meanwhile, in a case where the elevation angle of the GPS satellite 2 is greater than 35° (threshold θT), as indicated by the line segment A in FIG. 2, the accuracy of the reference signal (1 PPS) output from the GPS receiver 10 is relatively high and substantially constant regardless of the elevation angle of the GPS satellite 2.

In addition, the line segment A is a line segment obtained by approximating (fitting) a large number of results illustrated in FIG. 2 by a linear function by a least-squares method or the like in a range where the elevation angle is 35° or greater. The line segment B is a line segment obtained by approximating (fitting) a large number of results illustrated in FIG. 2 by a linear function by a least-squares method or the like in a range where the elevation angle is 35° or less. However, the threshold value θT is not limited thereto, and can be appropriately set. For example, the threshold value θT can be determined in advance based on data indicating the relationship between the elevation angles of each of the GPS satellites and the error of the reference signal. The threshold value θT may be determined in consideration of the allowable error range of the output timing signal. For example, based on FIG. 2, in a case where a certain degree of error is allowable, θT may be 30° or greater when, and may be 40° or greater in a case where it is preferable that error is less likely to occur.

In this manner, in a case where the GPS receiver 10 generates the reference signal (1 PPS) using the satellite signal from the GPS satellite 2 having a relatively small elevation angle, the error of the generated reference signal (1 PPS) increases. Therefore, when the oscillation of the atomic oscillator 30 is synchronized with the reference signal (1 PPS) from the GPS receiver 10 as it is, the accuracy of the oscillation frequency (frequency of the clock signal) of the atomic oscillator 30 also deteriorates, and further, the accuracy of the timing signal (1 PPS) which is an output signal of the timing signal output device 1 also deteriorates.

Here, in the timing signal output device 1, the synchronization timing of the synchronizer 26 is corrected based on the elevation angle of the GPS satellite 2. More specifically, after obtaining the elevation angle information of the GPS satellite 2 based on the satellite information from the GPS receiver 10, the controller 23 reads the correction coefficient 61 from the storage 60 and computes the correction value based on the elevation angle of the GPS satellite 2 by using a calculation formula which will be described later. In addition, the controller 23 adds a signal (voltage) of a voltage value that corresponds to the computed correction value to the output signal (voltage) of the phase comparator 21 and inputs the result to the loop filter 22.

For example, the output signal of the phase comparator 21 and the output signal of the controller 23 are added by an adder (not illustrated) disposed between the phase comparator 21 and the loop filter 22, and input to the loop filter 22. Accordingly, by the synchronizer 26, an operation is performed such that the phase difference between 1 PPS (reference signal) output by the GPS receiver 10 and the 1 Hz frequency-divided clock signal (a signal based on the clock signal of the atomic oscillator 30) output by the frequency divider 24, is stabilized by a shift amount that corresponds to the correction value from the controller 23. Therefore, it is possible to perform the correction for shifting the timing at which 1 PPS (reference signal) output by the GPS receiver 10 and the 1 Hz frequency-divided clock signal (a signal based on the clock signal of the atomic oscillator 30) output by the frequency divider 24 are synchronized, in accordance with the correction value from the controller 23. In other words, it is possible to synchronize the reference signal and the clock signal in a state where the phases are shifted by a predetermined shift amount. In addition, the correction can also be performed by correcting the output of the loop filter 22 based on the computed correction value.

Hereinafter, the computation of the correction value will be described in detail with reference to the example illustrated in FIG. 3.

For example, when the reference signal is generated based on the satellite signal from the GPS satellite 2 with an elevation angle of 10°, the error of the reference signal becomes +30 [ns] as illustrated in FIG. 3. In addition, the error of the reference signal based on the satellite signal from the GPS satellite 2 with the elevation angle of 20° becomes +20 [ns]. In addition, the error of the reference signal based on the satellite signal from the GPS satellite 2 with the elevation angle of 80° becomes ±0 [ns]. Therefore, in a case where the GPS receiver 10 determines one time by averaging the times obtained from the satellite signals from these GPS satellites 2, the error (delay time amount with respect to the correct reference signal) of the reference signal generated by using the satellite signals from these three GPS satellites 2 is (30+20+0)/3=16.7 [ns]. Here, "error" means the delay time amount with respect to the correct reference signal, and the code "+" added to the numerical value of the error indicates that the value is delayed compared to the reference signal.

Such an error of the reference signal can be computed using the result (that is, a linear function indicating the line segment B) illustrated in FIG. 2 as described above. Here, the inclination of the line segment B corresponds to the correction coefficient 61 stored in advance in the storage 60. As described above, in a case where the elevation angle of the GPS satellite 2 is 35° or less, which is the threshold θT, as indicated by the line segment B in FIG. 2, every time the elevation angle of the GPS satellite 2 decreases by 1°, a delay of 1.2 [ns] occurs. Therefore, by using such a relationship between the elevation angle of the GPS satellite 2 and the delay amount of the reference signal (a linear function indicating the line segments A and B), it is possible to compute the error of the reference signal described above with relatively high accuracy. In other words, the error of the reference signal based on the satellite signal from the GPS satellite 2 at the elevation angle θ smaller than the threshold θT (35° in the example) illustrated in FIG. 2 is (θT−0)×1.2 [ns]. In addition, the error of the reference signal based on the satellite signal from the GPS satellite 2 at the elevation angle which is equal to or greater than the threshold θT (35° in the example) is ±0 [ns]. In the example, the correction coefficient 61 is 1.2 [ns/°]. However, the correction coefficient 61 is not limited thereto, and can be appropriately set.

For example, it can be ascertained that the error of the reference signal based on the satellite signal from the GPS satellite 2 with the elevation angle of 10° is (35[°]−10[°])× 1.2 [ns/°]=+30 [ns]. Similarly, it can be ascertained that the error of the reference signal based on the satellite signal from the GPS satellite 2 with the elevation angle of 20° is (35[°]−20[°])×1.2 [ns/°]=+18 [ns]. In addition, it can be ascertained that the error of the reference signal based on the satellite signal from the GPS satellite 2 with the elevation angle of 80° is ±0 [ns]. The result substantially matches the data of FIG. 3.

Then, it is possible to predict that the error (the delay time amount with respect to the correct reference signal) of the reference signal generated using the satellite signals from the three GPS satellites 2 is (30 [ns]+18 [ns]+0 [ns])/3 =16 [ns]. Therefore, by setting the value that cancels out the predicted value (−16 [ns] in the example) as the correction value and by shifting the timing for synchronizing the timing signal with the reference signal by the correction value, it is possible to improve the accuracy of the generated timing signal.

As described above, the timing signal output device 1 includes the timing signal generation circuit 11 which corrects the timing synchronized with the reference signal (the output signal of the GPS receiver 10) based on the satellite signal received from the GPS satellite 2 that is the positioning satellite based on the elevation angle of the GPS satellite 2 (hereinafter, also referred to as "timing correction"), and generates the timing signal (1 PPS) synchronized with the reference signal at the corrected timing. In other words, the timing signal output device 1 includes the timing signal generation circuit 11 which generates the timing signal synchronized with the timing based on the elevation angle of the GPS satellite 2 with respect to the reference signal based on the satellite signal received from at least one GPS satellite 2 (positioning satellite), and the timing signal generation circuit 11 corrects the timing of synchronization of the timing signal with respect to the reference signal based on the elevation angle.

According to the timing signal output device 1, the timing signal (the output signal of the timing signal generation circuit 11) synchronized with the reference signal at the timing based on the elevation angle of the GPS satellite 2 is generated. The error of arrival time of the satellite signal to the GPS receiver 10 differs depending on the magnitude of the elevation angle of the GPS satellite 2. There is a case where the error of the arrival time affects the accuracy of the timing signal. Therefore, by generating the timing signal synchronized with the reference signal at the timing based on the elevation angle of the GPS satellite 2, it is possible to reduce the error of the timing signal (the output signal of the timing signal generation circuit 11) caused by the error of the arrival time of the satellite signal that corresponds to the elevation angle of the GPS satellite 2. Therefore, it is possible to reduce accuracy deterioration of the timing signal (1 PPS).

Here, the timing signal generation circuit 11 includes: the atomic oscillator 30 which is an oscillator that outputs a clock signal; the synchronizer 26 which generates the timing signal by synchronizing the clock signal from the atomic oscillator 30 and the reference signal from the atomic oscillator 30 with each other at the timing based on the elevation angle of the GPS satellite 2; and a timing corrector 231A which performs the timing correction by controlling the synchronizer 26 based on the elevation angle of the GPS satellite 2. Accordingly, it is possible to correct the timing of synchronizing the timing signal with the reference signal (the output signal of the GPS receiver 10) by a relatively simple configuration.

In particular, the timing signal generation circuit 11 performs the timing correction in a case where the elevation angle of at least one GPS satellite 2 is equal to or less than a predetermined angle (threshold value θT). Accordingly, in a case where there are one or more GPS satellites 2 of which the elevation angle is equal to or less than the predetermined angle, the correction is performed, and thus, it is possible to suppress accuracy deterioration of the timing signal.

In the embodiment, the timing signal output device 1 includes the storage 60 in which the correction coefficient 61 is stored as a coefficient used for timing correction. Accordingly, it is possible to correct the timing of synchronizing the timing signal with the reference signal using the correction coefficient 61 stored in the storage 60.

In addition, the timing signal generation circuit 11 is operated in the normal positioning mode which is a first mode for repeatedly obtaining the position based on the satellite signal from the GPS satellite 2 (satellite), and in the position fixing mode which is a second mode for determining the position of the reception point using the repeatedly obtained position and generating the timing signal. Accordingly, in the normal positioning mode, it is possible to repeatedly obtain the position of the reception point. In addition, in the position fixing mode, since the position is determined by using the repeatedly obtained position, it is possible to generate a more accurate timing signal than that in a case of obtaining the position one time.

Here, the above-described timing correction can be performed in either or both of the normal positioning mode and the position fixing mode. In a case of performing the timing correction when the timing signal generation circuit 11 is in the normal positioning mode (first mode), it is possible to reduce the accuracy deterioration of the timing signal. Meanwhile, for example, there is a case where the accuracy of the reference signal deteriorates when using the satellite signals from the GPS satellites 2 positioned in a wide range of elevation angle in order to improve the positioning accuracy. Meanwhile, in a case of performing the timing correction when the timing signal generation circuit 11 is in the position fixing mode (second mode), in addition to making the accuracy of the timing signal excellent in the second mode, the accuracy deterioration of the timing signal can further be reduced by the correction, and thus, it is possible to generate a more accurate timing signal. In a case of performing the timing correction in both of the first mode and the second mode, it is possible to always generate a highly accurate timing signal.

Second Embodiment

Figure 4:
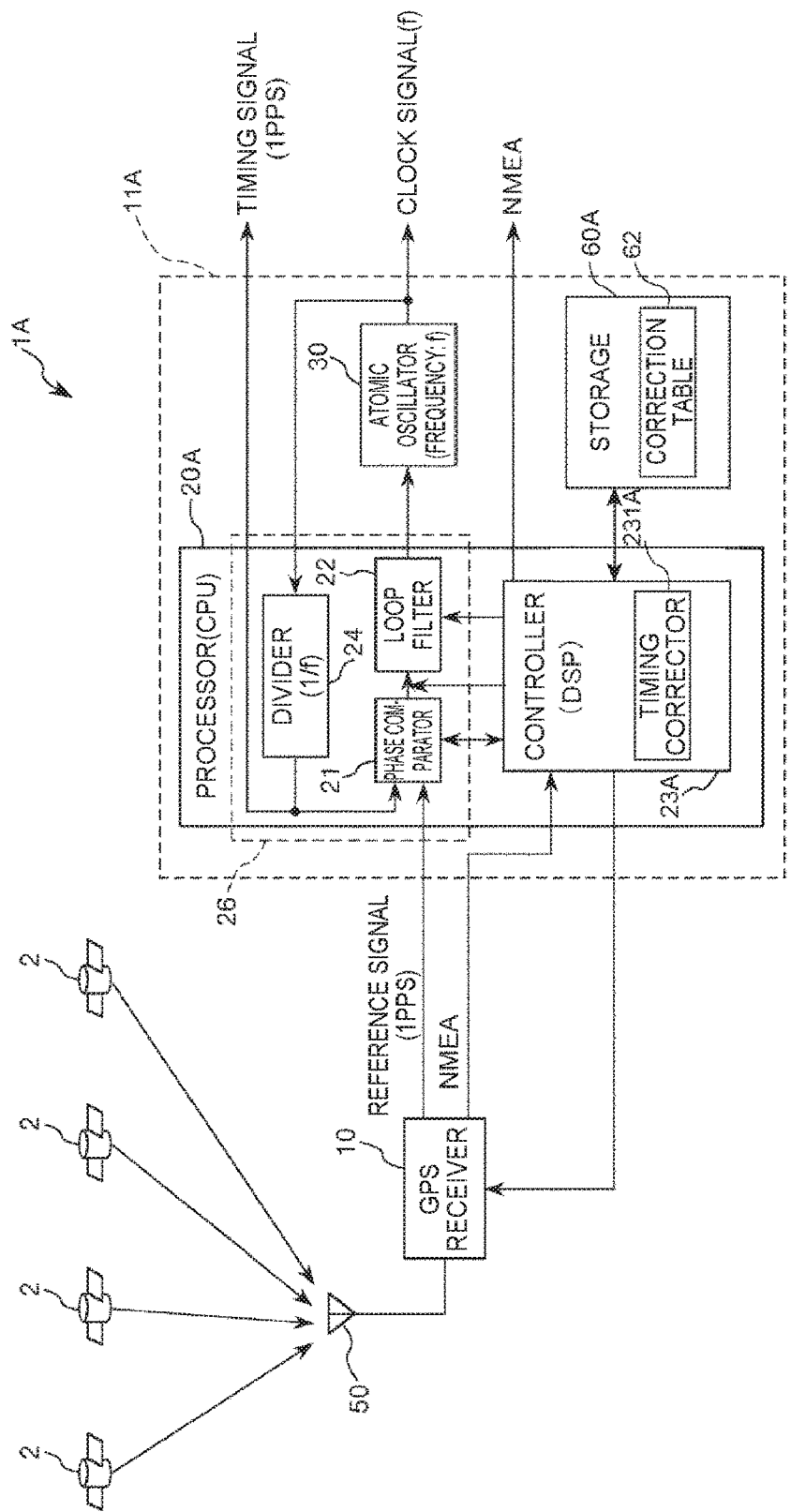
FIG. 4 is a view illustrating a schematic configuration of a timing signal output device according to a second embodiment.

FIG. 4 is a view illustrating a schematic configuration of the timing signal output device according to a second embodiment.

Hereinafter, the second embodiment will be described, but the differences from the above-described embodiment will be mainly described, and description of similar contents will be omitted. In addition, in FIG. 4, the same reference numerals will be given to the same configurations as those in the above-described embodiment.

The embodiment is the same as the above-described first embodiment except that the timing correction is performed using the correction table.

A timing signal output device 1A illustrated in FIG. 4 includes a GPS receiver 10 and a timing signal generation circuit 11A. Here, the timing signal generation circuit 11A includes a processor 20A (CPU), the atomic oscillator 30 (oscillator), the GPS antenna 50, and a storage 60A.

The processor 20A includes the phase comparator 21, the loop filter 22, a controller 23A, and the frequency divider 24. The controller 23A has a function of controlling the operation of the synchronizer 26 by using the information (a correction table 62 in the embodiment) stored in the storage 60A based on the satellite information (in particular, the elevation angle information of the GPS satellite 2) included in the NMEA data. In other words, the controller 23A has a timing corrector 231A that corrects the synchronization timing in the synchronizer 26 using the correction table 62.

The correction table 62 is stored in the storage 60A. The correction table 62 is a table which is used in correcting the synchronization timing of the synchronizer 26 based on the elevation angle of the GPS satellite 2. The table is a table in which the elevation angle of the GPS satellite 2 and the correction value are associated with each other based on the line segment B illustrated in FIG. 2 of the above-described first embodiment, as illustrated in Table 1 below.

TABLE 1

| | Elevation angle [°] | | | | | | | | | | | | | | | | | |
|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 |
| Correction value [ns] | −42 | −41 | −40 | −38 | −37 | −36 | −35 | −34 | −32 | −31 | −30 | −29 | −28 | −26 | −25 | −24 | −23 | −22 |
| | Elevation angle [°] | | | | | | | | | | | | | | | | | |
| | 18 | 19 | 20 | 21 | 22 | 23 | 24 | 25 | 26 | 27 | 28 | 29 | 30 | 31 | 32 | 33 | 34 | 35 |
| Correction value [ns] | −20 | −19 | −18 | −17 | −16 | −14 | −13 | −12 | −11 | −10 | −8 | −7 | −6 | −5 | −4 | −2 | −1 | 0 |

In addition, in Table 1, for convenience of description, the correction value is associated with every elevation angle of 1°. However, the correction value is not limited thereto, and for example, correction value may be associated with every elevation angle of 0.1°, 0.5°, or 2°. In addition, although not illustrated in Table 1, the correction value in a case where the elevation angle is greater than 35° (threshold θT) is 0 ns. In other words, regarding the satellite signals of the GPS satellite 2 of which the elevation angle is greater than 35° (threshold θT), no correction is performed similarly to the above-described first embodiment.

In this manner, the timing signal output device 1A includes the storage 60A in which the correction table 62 is stored as information related to the table used for timing correction. Accordingly, it is possible to correct the timing of synchronizing the timing signal with the reference signal using the correction table 62 stored in the storage 60A. In a case of using the correction table 62 in this manner, there is an advantage that the processing speed is faster than that in a case of using the correction coefficient 61 similarly to the above-described first embodiment.

According to the second embodiment as described above, the same effects as those of the above-described first embodiment can be achieved.

Third Embodiment

Figure 5:
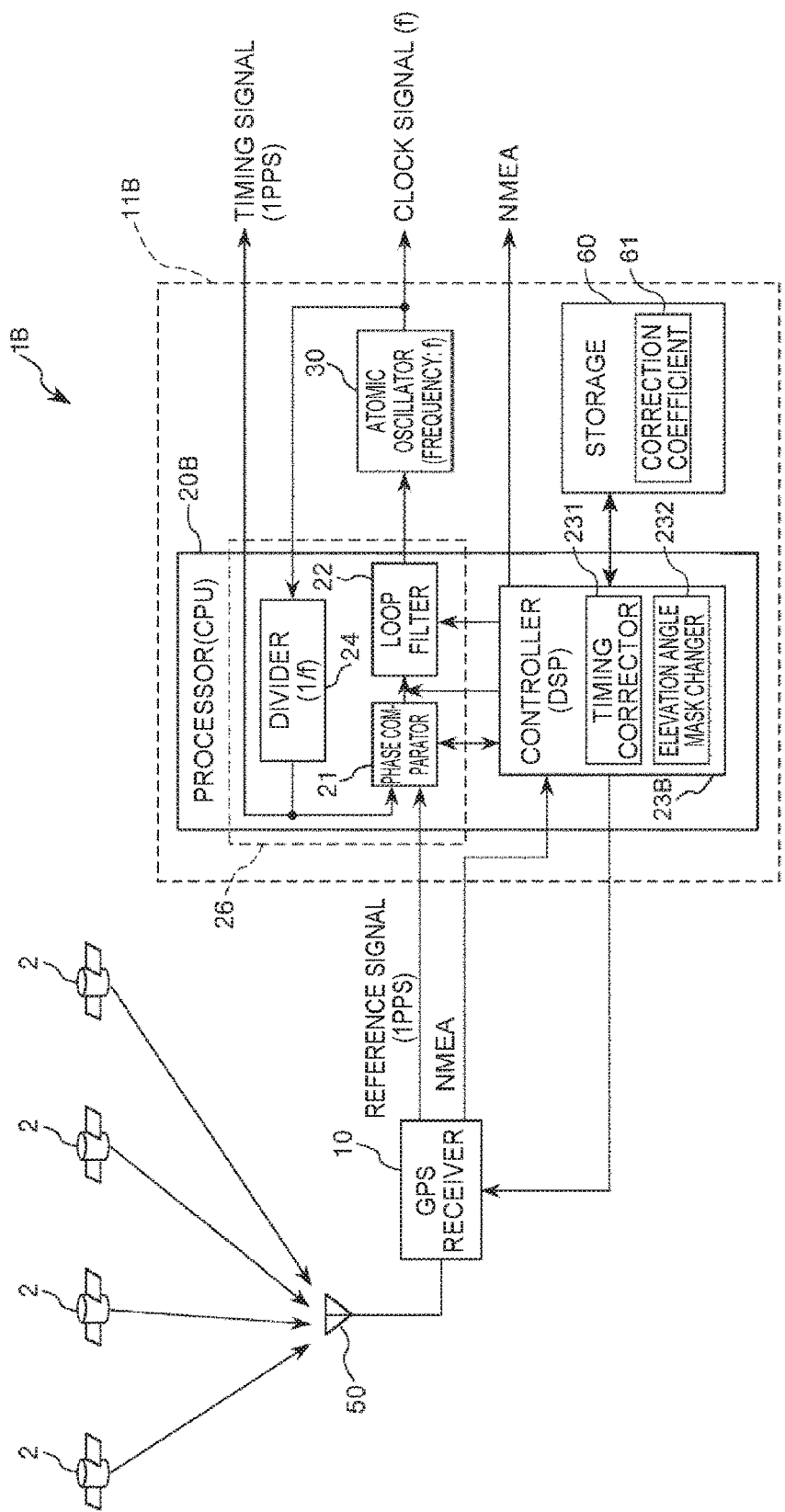
FIG. 5 is a view illustrating a schematic configuration of a timing signal output device according to a third embodiment.
Figure 6:
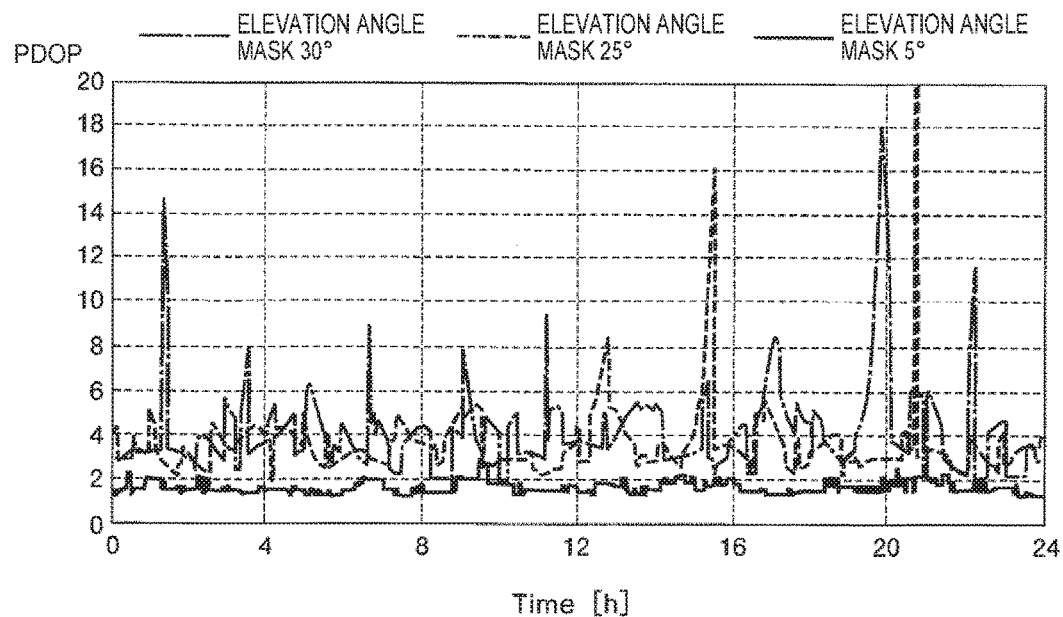
FIG. 6 is a graph illustrating a relationship between time and position dilution of precision (PDOP) of a satellite signal.
Figure 7:
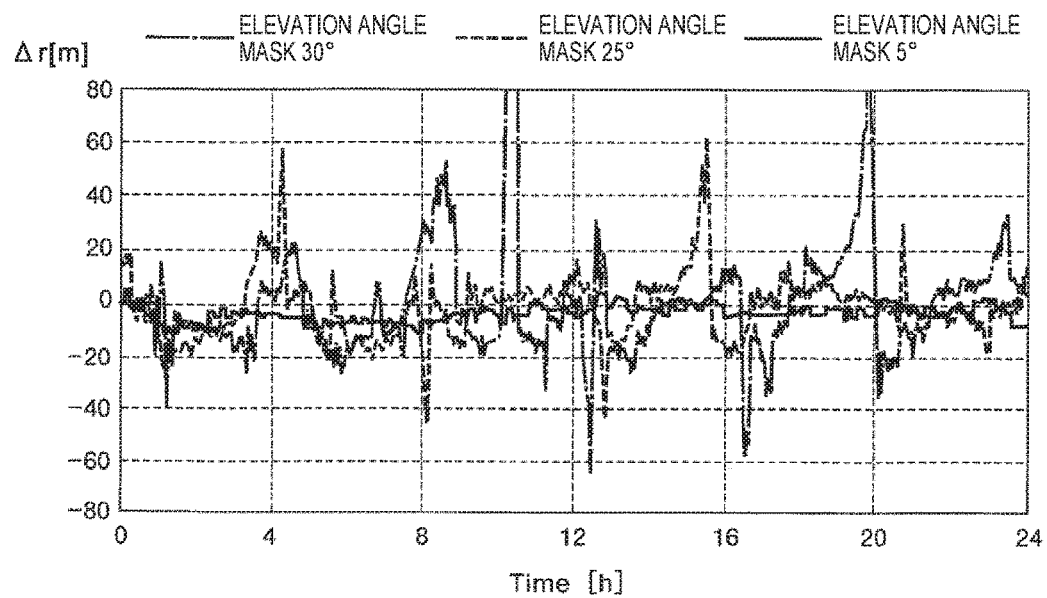
FIG. 7 is a graph illustrating the relationship between time and positional accuracy of the satellite signal.
Figure 8:
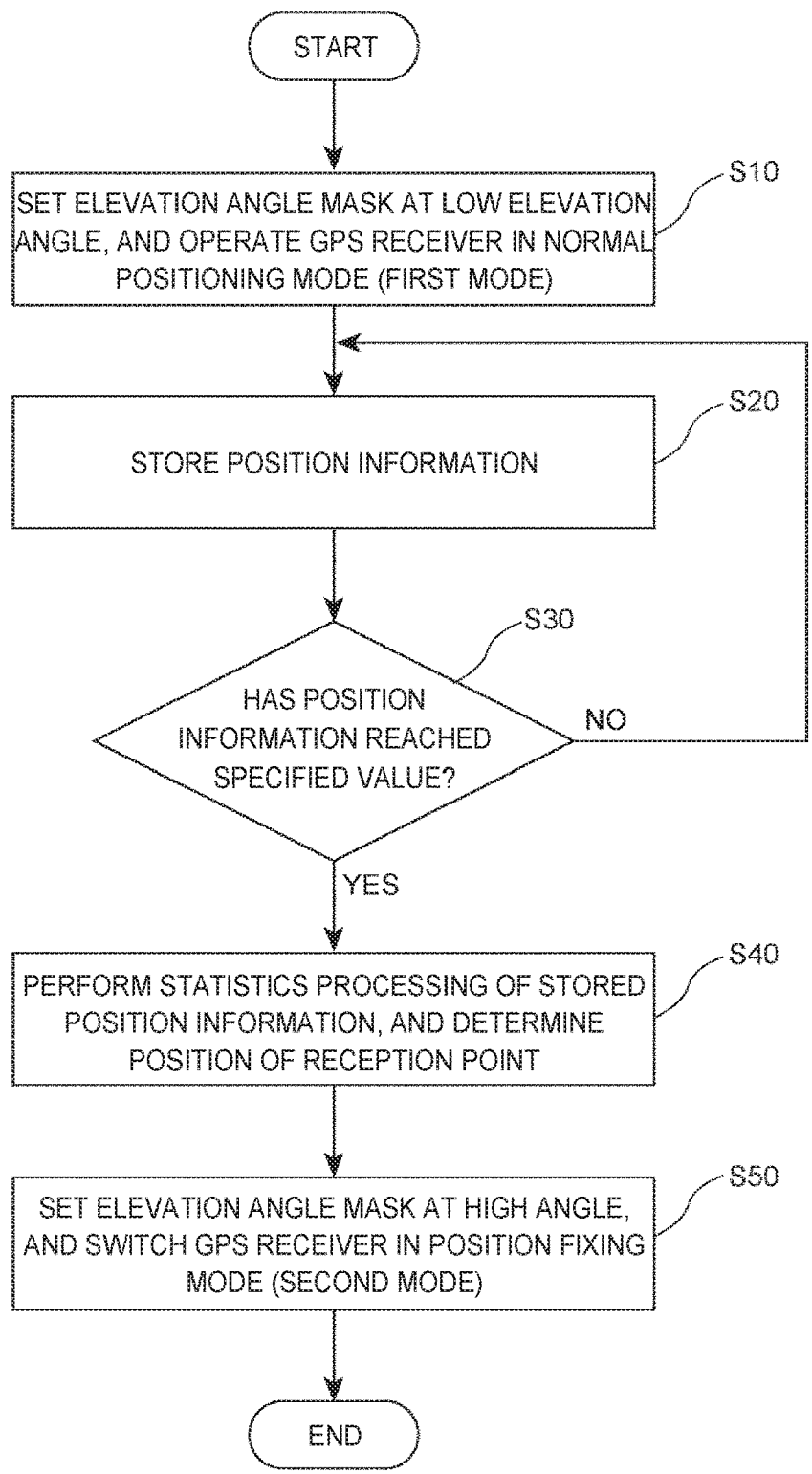
FIG. 8 is a flowchart for describing an operation of the timing signal output device illustrated in FIG. 5.

FIG. 5 is a view illustrating a schematic configuration of the timing signal output device according to a third embodiment. FIG. 6 is a graph illustrating the relationship between time and position dilution of precision (PDOP) of the satellite signal. FIG. 7 is a graph illustrating the relationship between time and positional accuracy of the satellite signal. FIG. 8 is a flowchart for describing an operation of the timing signal output device illustrated in FIG. 5.

Hereinafter, the third embodiment will be described, but the differences from the above-described embodiment will be mainly described, and description of similar contents will be omitted. In addition, in FIG. 5, the same reference numerals will be given to the same configurations as those in the above-described embodiment.

The embodiment is similar to the above-described first embodiment except that the setting of an elevation angle mask of the receiver can be changed.

A timing signal output device 1B illustrated in FIG. 5 includes a GPS receiver 10 and a timing signal generation circuit 11B. Here, the timing signal generation circuit 11B includes a processor 20B (CPU), the atomic oscillator 30 (oscillator), the GPS antenna 50, and the storage 60.

The processor 20B includes the phase comparator 21, the loop filter 22, a controller 23B, and the frequency divider 24. The controller 23B includes an elevation angle mask changer 232 having a function of changing the elevation angle mask of the GPS receiver 10.

As described in the first embodiment, in a case where the elevation angle of the GPS satellite 2 is relatively small (35° or less), the error of the reference signal generated by the GPS receiver 10 increases. Meanwhile, as illustrated in FIGS. 6 and 7, as the elevation angle mask of the GPS receiver 10 becomes smaller, the positioning accuracy and the positional accuracy are improved. This is because, when the elevation angle mask becomes smaller, the number of GPS satellites 2 that can be used for positioning increases.

Here, the controller 23B sets the elevation angle mask at the first angle (low elevation angle) in the normal positioning mode (the first mode), and sets the elevation angle mask at the second angle (high elevation angle) which is greater than the first angle in the position fixing mode (second mode). Accordingly, it is possible to improve both the positioning accuracy in the normal positioning mode and the timing accuracy in the position fixing mode.

More specifically, as illustrated in FIG. 8, the controller 23B first activates the GPS receiver 10, sets the elevation angle mask of the GPS receiver 10 to the first angle of low elevation angle, and starts the operation in the normal positioning mode (first mode) (step S10). Accordingly, the timing signal output device 1B performs the positioning calculation (computes the position information which is information related to the position of the reception point).

Here, the first angle of the elevation angle mask is preferably 0° or greater and 30° or less, more preferably 0° or greater and 25° or less, and even more preferably 5° or greater and 25° or less. By setting the elevation angle mask at a low elevation angle, the number of GPS satellites 2 that can be used for positioning increases, and thus, the position of the reception point can be measured with high accuracy. However, depending on an installation location of the GPS receiver 10 (GPS antenna 50), there is a possibility that the satellite signals from the GPS satellites 2 with a low elevation angle are affected by multipath. In this case, the first angle is preferably 5° or greater, 15° or greater, or the like.

In addition, the controller 23B stores the position information which is the positioning calculation result obtained from the GPS receiver 10 in the storage 60 (step S20), and determines whether or not the information amount (number of pieces of data or the like) of the position information has reached the specified value (step S30). In a case where it is determined that the information amount of the position information stored in the storage 60 has not reached the specified value (NO in step S30), the process returns to the above-described step S20. Therefore, step S20 is repeated until the information amount of the position information stored in the storage 60 reaches the specified value.

Here, the specified value in step S30 is preferably an amount obtained over a time length of approximately 24 hours. Accordingly, it is possible to measure the position of the reception point with high accuracy.

Meanwhile, in a case where it is determined that the information amount of the position information stored in the storage 60 has reached the specified value (YES in step S30), the statistical processing (computation of an average value, a median, or a mode) of the position information (a plurality of pieces of position information for each time) stored in the storage 60 is performed, and the position of the reception point is determined (step S40).

After this, the controller 23B sets the elevation angle mask of the GPS receiver 10 to the second angle of the high elevation angle, and switches the operation mode of the GPS receiver 10 to position fixing mode (second mode) (step S50). Accordingly, the timing signal output device 1B generates the timing signal (1 PPS) by using the position information of the reception point obtained in the above-described normal positioning mode and the reference signal from the GPS receiver 10.

Here, the second angle of the elevation angle mask is preferably 30° or greater and 50° or less, and more preferably 35° or greater and 50° or less. Accordingly, it is possible to generate a highly accurate timing signal without performing the timing correction as described in each of the above-described embodiments.

In this manner, the timing signal output device 1B includes the GPS receiver 10 which is a receiver that receives the satellite signal and outputs the reference signal based on the satellite signal. In addition, the timing signal generation circuit 11B sets an elevation angle mask of the first angle with respect to the GPS receiver 10 in a case of the normal positioning mode (the first mode), and sets an elevation angle mask of the second angle which is greater than the first angle with respect to the GPS receiver 10 in a case of the position fixing mode (the second mode). Accordingly, in the normal positioning mode, by widening the range of the elevation angle mask, it is possible to increase the number of GPS satellites 2 which receive the satellite signal by the GPS receiver 10, and to improve the accuracy of an output position. Meanwhile, in the position fixing mode, the elevation angle mask having the second angle which is greater than the first angle is set. A satellite signal from the GPS satellite 2 with a small elevation angle is more likely to have an error in arrival time than the satellite signal from the GPS satellite 2 having a large elevation angle. Therefore, by using the satellite signal from the GPS satellite 2 with a large elevation angle, it is possible to improve the accuracy of the timing signal.

Here, in the normal positioning mode, not only the positioning calculation but also the timing signal generation may be performed, and in this case, by performing the timing correction as described in the first embodiment, it is possible to generate a highly accurate timing signal even when the elevation angle mask of the GPS receiver 10 becomes smaller. In addition, in the position fixing mode, since the elevation angle mask of the GPS receiver 10 is relatively large, it is possible to generate a highly accurate timing signal without performing the timing correction as described in the first embodiment. In addition, in the position fixing mode, the timing correction described in the first embodiment may be performed, and in this case, the arithmetic operation of the timing correction may be reduced, and there is an advantage that the timing correction with higher accuracy becomes easier.

In particular, as described above, it is preferable that the first angle of the elevation angle mask set in the GPS receiver 10 in the normal positioning mode is 0° or greater and 30° or less and the second angle of the elevation angle mask set in the GPS receiver 10 in the position fixing mode is 30° or greater and 50° or less. Accordingly, it is possible not only to obtain a position at which the accuracy is excellent in the normal positioning mode, but also to suppress the accuracy deterioration of the timing signal in the position fixing mode.

2. Electronic Device

Next, an embodiment of the electronic device will be described.

Figure 9:
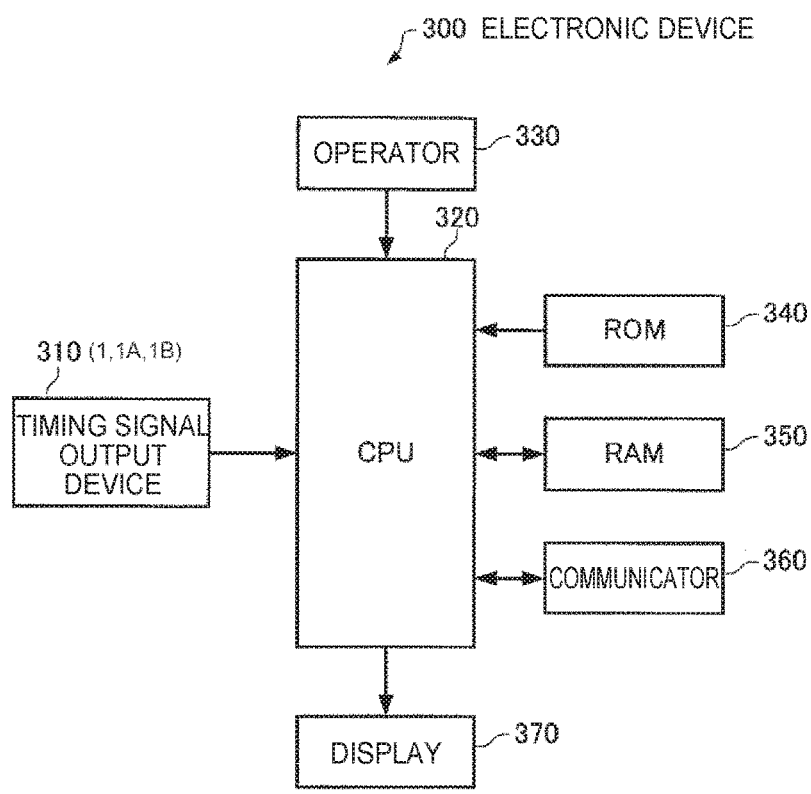
FIG. 9 is a block diagram illustrating an embodiment of an electronic device.

FIG. 9 is a block diagram illustrating an embodiment of an electronic device.

An electronic device 300 illustrated in FIG. 9 includes a timing signal output device 310, a central processing unit (CPU) 320, an operator 330, a read only memory (ROM) 340, a random access memory (RAM) 350, a communicator 360, and a display 370.

The timing signal output device 310 is, for example, the above-described timing signal output devices 1, 1A, or 1B, and as described above, the timing signal output device 310 receives a satellite signal to generate a highly accurate timing signal (1 PPS) and output the signal to the outside.

The CPU 320 performs various types of calculation processing or control processing according to a program stored in the ROM 340 or the like. Specifically, in synchronization with the timing signal (1 PPS) or the clock signal which is output by the timing signal output device 310, the CPU 320 performs a counting process, various types of processing that correspond to the operation signal from the operator 330, processing for controlling the communicator 360 for performing data communication with the outside, processing for transmitting a display signal for displaying various types of information on the display 370, and the like.

The operator 330 is an input device configured with an operation key, a button switch or the like, and outputs an operation signal that corresponds to an operation by a user to the CPU 320.

The ROM 340 stores the program or data for performing various types of calculation processing or control processing by the CPU 320.

The RAM 350 is used as a work area of the CPU 320, and temporarily stores programs and data read from the ROM 340, data input from the operator 330, arithmetic operation results executed by the CPU 320 according to various programs, and the like.

The communicator 360 performs various controls for establishing data communication between the CPU 320 and the external device.

The display 370 is a display device configured with a liquid crystal display (LCD) or the like, and displays various types of information based on a display signal input from the CPU 320. A touch panel which functions as the operator 330 may be provided on the display 370.

Various electronic devices are conceivable as the electronic device 300, and although not particularly limited, for example, a server (time server) for time management which realizes synchronization with standard time, a time management device (time stamp server) which issues a time stamp, a frequency reference device, such as a base station, and the like, can be employed.

As described above, the electronic device 300 includes the timing signal output device 310. Accordingly, it is possible to improve the characteristics of the electronic device 300 by using the highly accurate timing signal from the timing signal output device 310.

3. Vehicle

Figure 10:
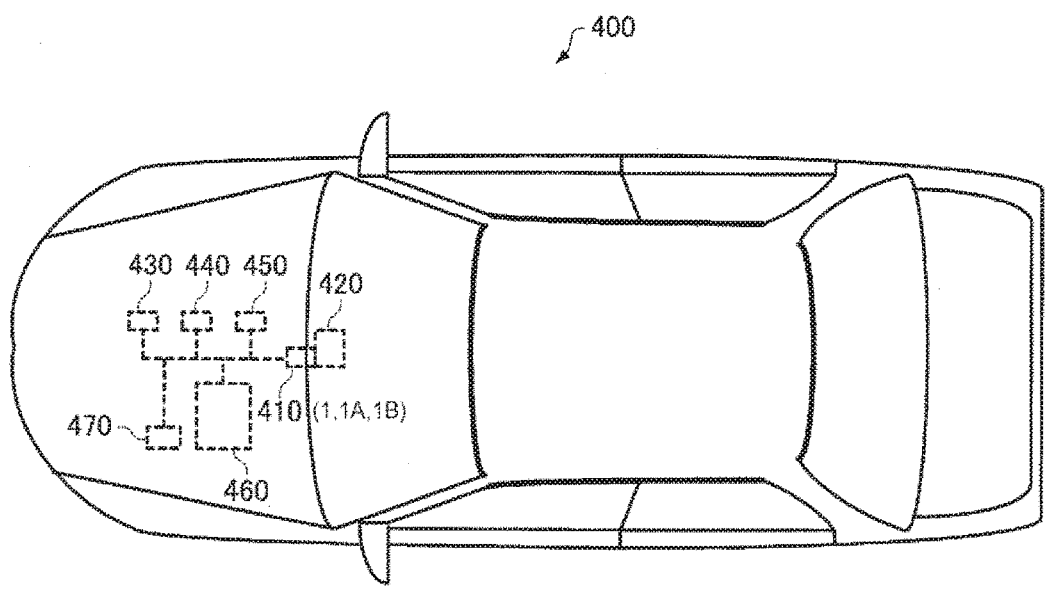
FIG. 10 is a view illustrating an embodiment of a vehicle.

FIG. 10 is a view illustrating an embodiment of a vehicle.

A vehicle 400 illustrated in FIG. 10 includes a timing signal output device 410, a car navigation device 420, controllers 430, 440, and 450, a battery 460, and a backup battery 470.

As the timing signal output device 410, the above-described timing signal output device 1, 1A, or 1B can be applied. For example, while the vehicle 400 is moving, the timing signal output device 410 performs positioning calculation in real time in a normal positioning mode and outputs 1 PPS, a clock signal, and NMEA data. In addition, for example, while the vehicle 400 is at a standstill, the timing signal output device 410 performs a plurality of times of positioning calculations in the normal positioning mode, and then, sets an average value, a mode, or a median of a plurality of positioning calculation results, as current position information, and outputs 1 PPS, a clock signal, and NMEA data in position fixing mode.

The car navigation device 420 displays a position, time, and other various types of information, on the display by using the NMEA data output by the timing signal output device 410 in synchronization with 1 PPS or the clock signal output by the timing signal output device 410.

The controllers 430, 440, and 450 perform various controls of an engine system, a brake system, a keyless entry system, and the like. The controllers 430, 440, and 450 may perform various controls in synchronization with the clock signal output by the timing signal output device 410.

As described above, the vehicle 400 includes the timing signal output device 410. Accordingly, it is possible to improve the characteristics of the vehicle 400 by using the highly accurate timing signal from the timing signal output device 410.

Since the vehicle 400 of the embodiment includes the timing signal output device 410, it is possible to secure high reliability both during the movement and during the stop.

In addition, although the illustrated vehicle 400 is a car, various vehicles are conceivable as the vehicle, and in addition to automobiles (including electric cars), for example, aircraft, such as jet aircraft and helicopter, ships, rockets, artificial satellites, and the like can be employed.

Above, although the timing signal output device, the electronic device, and the vehicle have been described based on the illustrated embodiments, the invention is not limited thereto.

In addition, the invention can be replaced by an arbitrary configuration that exhibits the same function as that of the above-described embodiment, and an arbitrary configuration can be added.

In addition, in the above-described embodiment, the timing signal output device using the GPS has been exemplified. However, a global navigation satellite system (GNSS) other than the GPS, for example, Galileo, GLONASS, or the like may be used.

What is claimed is:

1. A timing signal output device comprising:
a timing signal generation circuit configured to
receive a reference signal based on a satellite signal received from at least one positioning satellite,
receive elevation angle information of the at least one positioning satellite, and
generate a timing signal synchronized with the reference signal at a timing using a correction coefficient that is based on an elevation angle of the at least one positioning satellite, wherein the correction coefficient defines a relationship between a delay time and the elevation angle, by correcting the timing of the synchronization of the timing signal with the reference signal using the elevation angle information.

2. The timing signal output device according to claim 1, wherein the timing signal generation circuit includes a first mode for repeatedly obtaining a position based on the satellite signal, and a second mode for determining a position of a reception point using the repeatedly obtained position and generating the timing signal.

3. The timing signal output device according to claim 2, wherein the timing signal generation circuit corrects the timing of the synchronization in a case of the first mode.

4. The timing signal output device according to claim 2, wherein the timing signal generation circuit corrects the timing the synchronization in a case of the second mode.

5. The timing signal output device according to claim 2, further comprising:
a receiver configured to receive the satellite signal and output the reference signal and the position based on the satellite signal,
wherein the timing signal generation circuit sets an elevation angle mask of the receiver to a first angle in a case of the first mode, and sets the elevation angle mask to a second angle which is greater than the first angle in a case of the second mode.

6. The timing signal output device according to claim 5, wherein the first angle is 0° or greater and 30° or less, and wherein the second angle is 30° or greater and 50° or less.

7. The timing signal output device according to claim 1, wherein the timing signal generation circuit corrects the timing of the synchronization in a case where the elevation angle of the at least one positioning satellite is equal to or less than a predetermined angle.

8. The timing signal output device according to claim 1, further comprising:
a storage in which the correction coefficient or a table used for the correction are stored.

9. The timing signal output device according to claim 5, wherein the timing signal generation circuit includes an oscillator which outputs a clock signal, a synchronizer which generates the timing signal by synchronizing the clock signal and the reference signal at the timing, and a timing corrector which corrects the timing of the synchronization by controlling the synchronizer based on the elevation angle of the satellite.

10. An electronic device comprising:
the timing signal output device according to claim 1.

* * * * *